United States Patent

Premiski et al.

Patent Number: 5,806,405
Date of Patent: Sep. 15, 1998

[54] HYDRAULIC SERVO DEVICE FOR A FRICTION BRAKE IN A PLANETARY TRANSMISSION

[75] Inventors: Vladimir Premiski, Zuelpich-Buervenich; Friedel Lauscher, Kreuzau-Drove; Radovan Chudada, Aachen; Johann Kirchhoffer, Cologne; Gerd Wollschlaeger, Overath, all of Germany

[73] Assignee: Ford Global Technologies, Inc., Dearborn, Mich.

[21] Appl. No.: 756,856

[22] Filed: Nov. 26, 1996

(Under 37 CFR 1.47)

[51] Int. Cl.$^6$ ....................................................... F01B 7/00
[52] U.S. Cl. ................................................. 92/152; 92/110
[58] Field of Search ............................... 92/150, 151, 61, 92/62, 152, 110

[56] References Cited

U.S. PATENT DOCUMENTS

| | | | |
|---|---|---|---|
| 2,901,888 | 9/1959 | Swift | 92/152 |
| 3,753,377 | 8/1973 | General | 74/856 |
| 4,388,986 | 6/1983 | Umezawa | 92/65 |
| 4,601,233 | 7/1986 | Sugano | 92/152 |
| 4,787,494 | 11/1988 | Ogasawara et al. | 92/65 |

FOREIGN PATENT DOCUMENTS

3417703 C2  1/1987  Germany .
3417784 C2  1/1988  Germany .

*Primary Examiner*—Thomas E. Denion
*Attorney, Agent, or Firm*—Frank G. McKenzie

[57] ABSTRACT

An hydraulic servo device for a friction brake in a planetary transmission for motor vehicles contains a cylinder with stepped interior wall, a stationary dividing wall that has a hole and divides the interior of the cylinder into two regions, one piston in each of the two regions formed by the dividing wall, and a hollow piston rod that passes through the hole of the dividing wall and connects the two pistons. The wall of the cylinder has passages, through which a pressure medium enters or exits the cylinder, in each one of the regions formed by the dividing wall. The pistons in each of the regions of the cylinder divides each of the regions into an application-pressure chamber and a release-pressure chamber, forming four chambers in the order of an application-pressure chamber, a release-pressure chamber, an application-pressure chamber, and a release-pressure chamber. The hollow piston rod has openings which allow the pressure medium to enter or exit the piston rod and the application-pressure chambers. One of the ends of the piston rod is connected to the friction brake. The pressure caused by the inflow of the pressure medium moves the two pistons, which because of the rigid connecting rod, move with the same speed and direction, and the connecting rod, which engages or releases the friction brake, depending on the direction of the two pistons' motion.

2 Claims, 5 Drawing Sheets

HYDRAULIC SERVO DEVICE FOR A FRICTION BRAKE IN A PLANETARY TRANSMISSION

BACKGROUND OF THE INVENTION

1. Field of the Invention

The invention relates to the field of an hydraulic servo for a friction brake of a planetary transmission for motor vehicles.

2. Description of the Prior Art

From German Patent Specification 34 17 703, a planetary transmission for motor vehicles is known, in which an hydraulic servo device for a friction brake is provided in order to bring about a shift from second gear to third gear in a synchronous manner.

In this known servo device for the friction brake (see FIG. 4 of the Specification), a stepped or differential piston with two different piston faces $A_1$ and $A_2$ acts on a brake band via a piston rod and a transmission lever.

From German Patent Specification 34 17 784, an hydraulic control valve arrangement for a planetary transmission for motor vehicles is known, in which a shift from second gear to third gear is effected in a synchronous manner by applying a second clutch $CL_2$ and simultaneously releasing a second brake $B_2$ by supplying the pressure acting in the application-pressure chamber of the second clutch $CL_2$ simultaneously to the release-pressure chamber of the second brake $B_2$, whereby this acts as an accumulator.

SUMMARY OF THE INVENTION

It is an object of this invention to modify an hydraulic servo device for a friction brake of a planetary transmission for motor vehicles so that without the use of the transmission lever cooperating with the piston rod of the servo device, the original function of the servo device can largely be retained, yet a sufficiently high capacity of the servo device for the friction brake can be made available to adapt the planetary transmission to high-torque internal combustion engines.

A further object is to achieve this object for the servo device for a first friction brake $B_1$ and for a second friction brake $B_2$, namely for the control of the planetary transmission both as a 4-gear and as a 5-gear transmission, while retaining basically the same mechanical construction of the planetary transmission.

By disposing behind the stepped piston in the sections in the stepped cylinder a stationary dividing wall, through which the piston rod extends by way of a seal, and securing the piston rod to a third piston, which forms an application-pressure chamber and a release-pressure chamber in a third section in the cylinder, and providing that the application sides of the resulting tandem piston assembly are pressurizable via passages in the common piston rod and that their release-pressure chambers are selectively pressurizable via separate passages, the desired higher capacity is made available by the tandem piston arrangement while retaining the same diameter of the servo device. At the same time the synchronous 2-3 shift can be brought about by means of the different piston faces $A_2$ and $(A_1+A_3)$ on a piston.

BRIEF DESCRIPTION OF THE DRAWINGS

The invention will be explained in more detail, by way of example, with reference to embodiments shown in the accompanying drawings, in which.

DETAILED DESCRIPTION OF PREFERRED EMBODIMENTS

Figure 1:
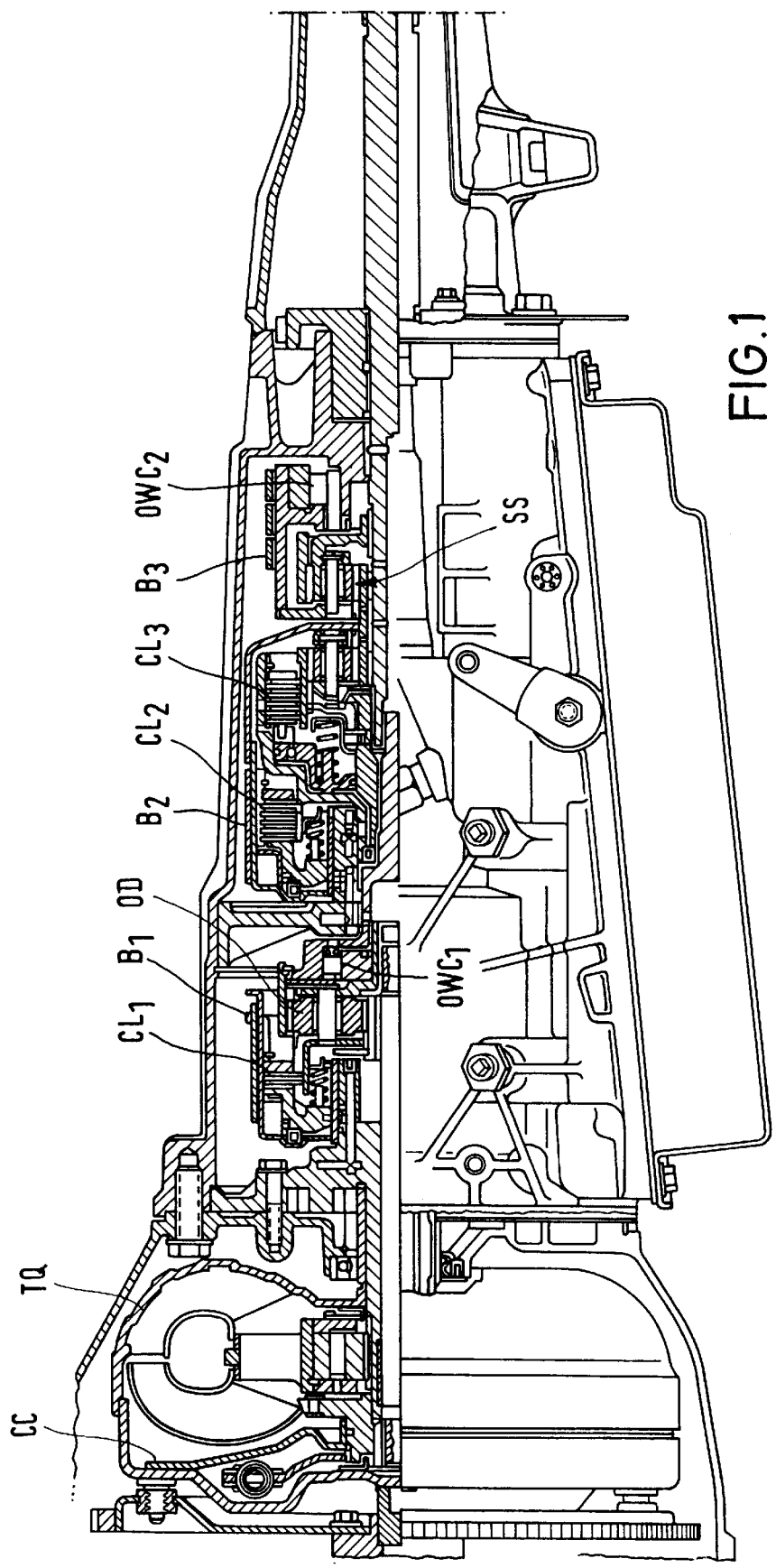
FIG. 1 is a partial vertical section through a planetary transmission for motor vehicles, in which the hydraulic servo device for a friction brake according to the invention can be used.

FIG. 1 shows a vertical partial section through a planetary transmission for motor vehicles substantially as has been described completely and in detail, in respect of its mechanical construction and the associated hydraulic control valve arrangements, in German Patent Specifications 34 17 703 and 34 17 784.

Accordingly, FIG. 1 shows only the main parts of the planetary transmission that are required in connection with the hydraulic servo device for a friction brake and for its explanation.

An hydrodynamic torque converter is indicated by TQ and a converter lock-up clutch by CC. An overdrive or preselector planetary gear set is indicated by OD and the main planetary transmission in the form of a Simpson planetary gear set, known per se, is indicated by SS. For shifting the overdrive planetary gear set OD, a first multiplate clutch $CL_1$, a first band brake $B_1$, and a one-way clutch $OWC_1$ are provided.

For shifting the Simpson planetary gear set SS, a second multiplate clutch $CL_2$, a second friction brake $B_2$, a third multiplate clutch $CL_3$, and a third friction brake $B_3$ are provided as well as a second one-way clutch $OWC_2$.

Figure 2:
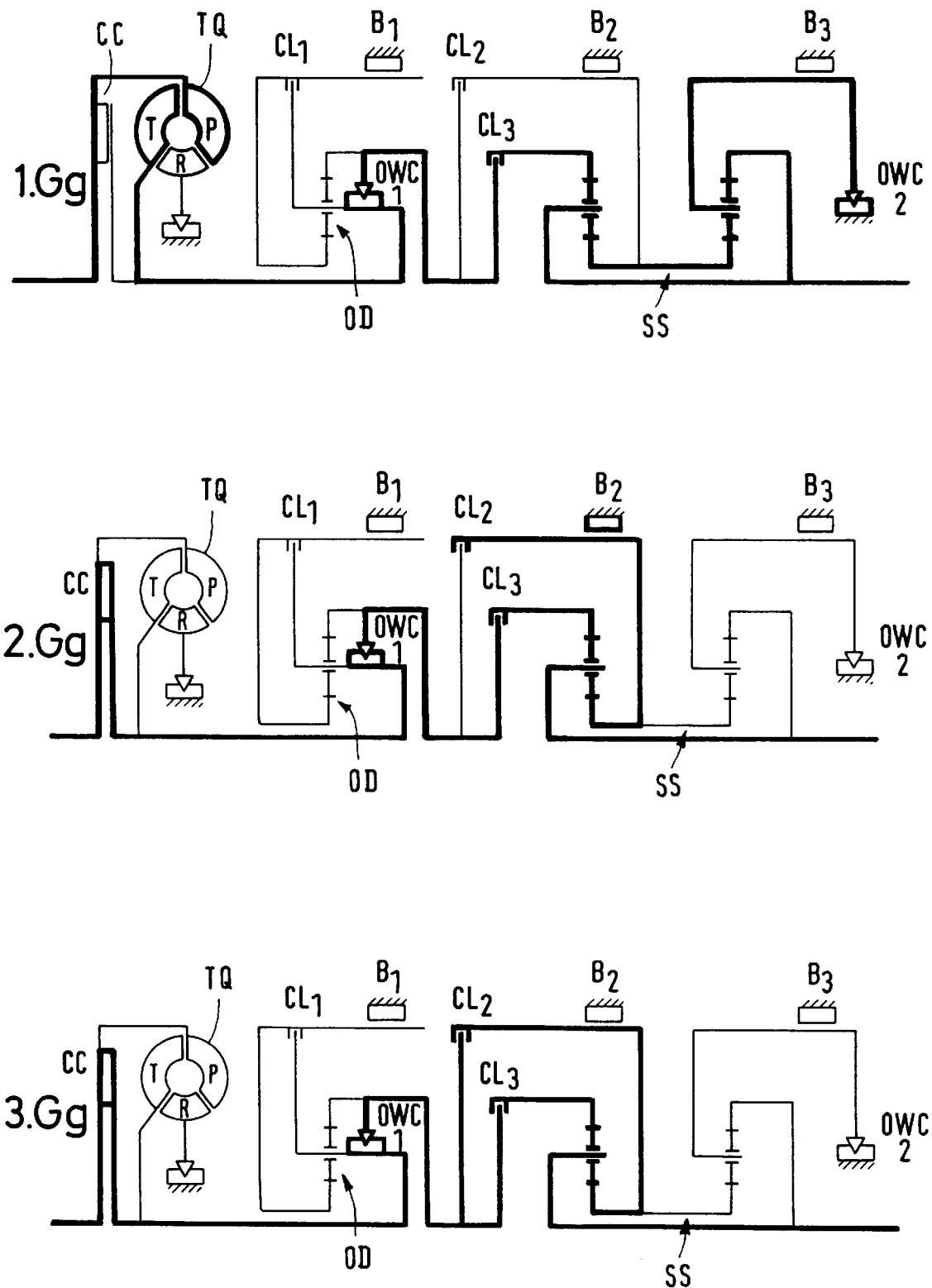
FIG. 2 shows 1.Gg-3.Gg schematic diagrams of the planetary transmission with the power flow through the transmission elements in first to third gears, respectively.

From FIG. 2, the power flow through the planetary transmission is indicated in the manner familiar to those skilled in the art, namely, by emphasizing with heavy lines the elements of the transmission that are effective and actuated in each case.

As can be seen from FIG. 2 1.Gg, in first gear the power transmission takes place via the torque converter and the first one-way clutch $OWC_1$ and via the third multiplate clutch $CL_3$ to the first ring gear of the Simpson planetary gear set SS, the second planet carrier of which is held in position by means of the second one* way clutch $OWC_2$, and the output drive to the output shaft takes place via the planet carrier of the first set and the ring gear of the second set of the Simpson planetary gear set SS.

In second gear, torque transfer again takes place at the ring gear of the first set of the Simpson planet gear set SS, for example via the closed converter lock-up clutch CC, the first one-way clutch $OWC_1$ and the third multiplate clutch $CL_3$. The sun gear of the Simpson planetary gear set SS is held fast by means of the second brake $B_2$, and the output shaft is again driven via the planet carrier of the first set of the Simpson planetary gear set SS.

To perform a shift from second gear to third gear, torque is again transferred to the ring gear of the first set of the Simpson planet gear set SS via the closed converter lock-up clutch CC, the one-way clutch $OWC_1$, and the third multiplate clutch $CL_3$. However, by application of the second multiplate clutch $CL_2$ and simultaneous release of the second friction brake $B_2$, the gearing action of the first set of the Simpson planetary gear set SS is prevented and the torque of the planet carrier of the first set of the Simpson planetary gear set SS is transferred 1:1 to the output shaft.

A shift from second gear to third gear is performed as a synchronous shift, i.e., the application of the second multiplate clutch $CL_2$ and the release of the second friction brake $B_2$ must take place in a precisely coordinated manner in order for a shift to be performed without any interruption in the flow of power and without gear-shifting shocks.

The design torque capacity of the second multiplate clutch $CL_2$ must be such that in reverse gear the torque reaction, which is then high, can be reliably withstood. In a shift from second to third gear, however, the second multiplate clutch $CL_2$ only needs to transfer about one-third of the original input torque; accordingly, the second multiplate clutch $CL_2$ is really provided with too high a capacity for a shift from second gear to third gear.

In order to compensate hydraulically for this mechanical condition, it is already known to employ the volume of the release-pressure chamber of the second friction brake $B_2$ as an accumulator during the application of the second multiplate clutch $CL_2$. For this purpose, the double-acting piston of the servo device for the second friction brake $B_2$ is formed, in a manner known per se, as a differential or stepped piston in which the areas of the two piston faces $A_1$ and $A_2$ are different, with the larger face $A_1$ adjoining the release-pressure chamber of the servo device and the smaller piston face $A_2$ adjoining the application-pressure chamber.

Figure 8:
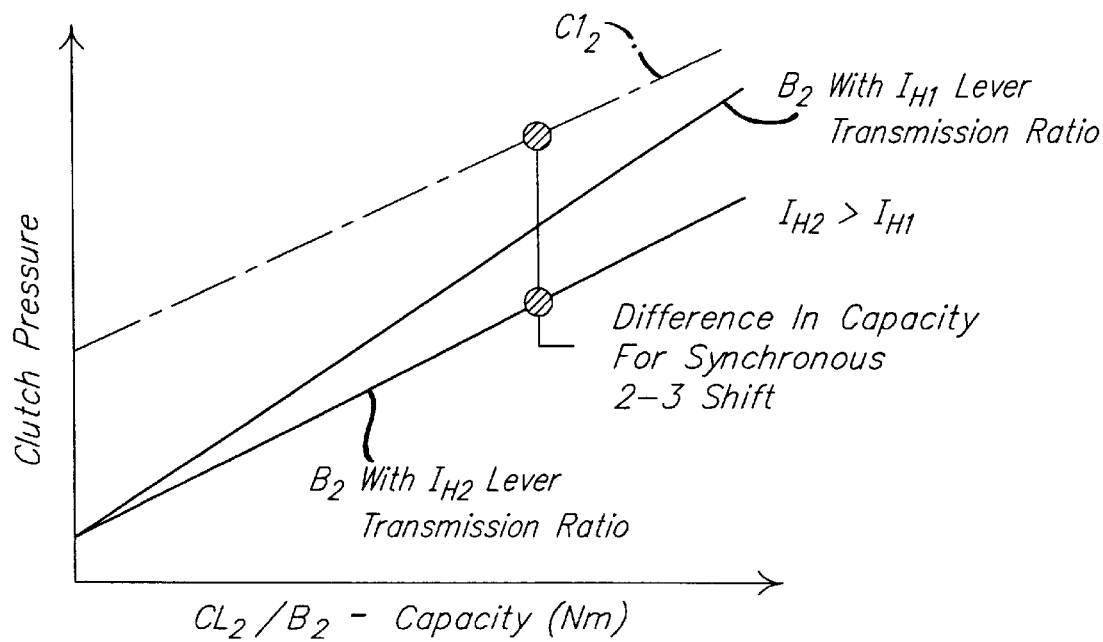
FIG. 8 is a capacity diagram, in which the capacity of the clutch $CL_2$ is constant and the capacity of the friction brake $B_2$ is variable by the adaptable lever transmission ratio.

To perform a shift from second gear to third gear, the application-pressure chamber of the second multiplate clutch $CL_2$ is first pressurized with pressure medium. While the multiplate clutch $CL_2$ is being applied, application pressure, which is made up of the force of its return spring divided by the piston face area, rises. This is the synchronization phase between the multiplate clutch $CL_2$ and the friction brake $B_2$. Line pressure acting on the multiplate clutch $CL_2$ presses the friction plates of the multiplate clutch against one another and the multiplate clutch begins to transfer torque. As soon as the application pressure in the multiplate clutch $CL_2$ increases enough to cause torque transfer to begin, the reaction torque on the friction brake $B_2$ is reduced. This results because the release-pressure chamber of the servo device for the friction brake $B_2$ is in communication with the application-pressure chamber of the multiplate clutch $CL_2$. The further the pressure in the application-pressure chamber of the multiplate clutch $CL_2$ rises, the higher does the pressure in the release-pressure chamber adjoining the piston face $A_1$ become, until finally it exceeds the force resulting from the pressure in the application-pressure chamber adjoining the smaller piston face $A_2$. At this point, the reaction torque on the friction brake $B_2$ falls to zero, and thereafter the multiplate clutch $CL_2$ transfers the full torque. In order to realize this synchronization process, the capacity of the friction brake $B_2$ must, independently of the hydraulic function described above, always be greater than the capacity of the clutch $CL_2$. This was formerly assured by the variable transmission ratio of the lever (see FIG. 8)

As so far described, the way in which the shift from second to third gear takes place is known from applicant's earlier patents and from use in the automatic transmissions made in series production by the applicant.

Through the desire in motor vehicle production programs to have the possibility of combining an automatic transmission that has been in production for many years with internal combustion engines of higher power output, the problem arose that the torque capacity of the second friction brake $B_2$ had to be increased, which would normally have been done by a corresponding change in the transmission lever previously used, had the use of such a transmission lever not been prevented by space constraints. A possible increase in the diameter of the servo device is likewise prevented by space constraints.

The invention will now be explained with reference to FIG. 3, which shows a vertical section through the new servo device for the second friction brake $B_2$ in accordance with the invention.

Figure 3:
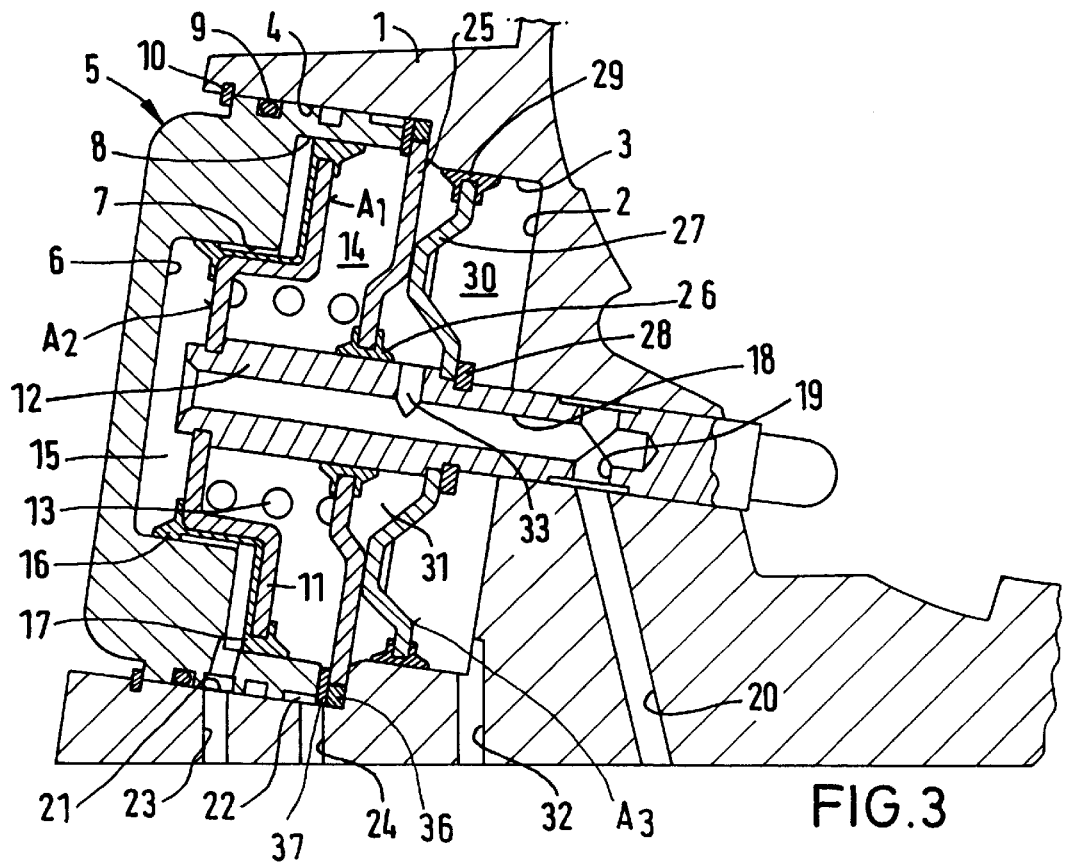
FIG. 3 is a vertical section through the hydraulic servo device for the friction brakes for shifting second gear in the form providing maximum torque capacity.

FIG. 3 shows a transmission housing 1 of a planetary transmission for motor vehicles, partly in section, in which the servo device for the second friction brake $B_2$ is fitted.

In the transmission housing 1, a cylinder bore 2 with stepped sections 3 and 4 of different diameters is formed. In section 4, a cap 5 of the servo device is inserted, which forms in its interior a cylinder 6 with stepped sections 7 and 8. The cap 5 is sealed in position in section 4 of the cylinder 2 by means of an O-ring 9 and a retaining ring 10, and is secured in the transmission housing 1.

In the sections 7 and 8 of the cylinder 6 formed by the cap 5, there is fitted a differential or stepped piston 11, which is connected to a piston rod 12 for actuating the brake band of the friction brake $B_2$ and is urged into its released position by a return spring 13.

The stepped piston 11 divides the cylinder 6 into a release-pressure chamber 14 with a piston face $A_1$ and an application pressure chamber 15 having a smaller piston face $A_2$. The stepped piston 11 is sealed in the respective sections 7 and 8 of the cylinder 6 by means of corresponding sealing sections 16 and 17.

The piston rod 12 is provided with an axial bore 18 and a transverse bore 19, through which pressure medium can be led from an application passage 20 to the application-pressure chamber 15. The cap 5 is provided on its outer circumference with annular grooves 21 and 22, which are in communication with the further release passages 23 and 24. Up to this point, the construction is essentially known. Details in accordance with the invention are described below.

Between section 3 and section 4 of cylinder 2 in the transmission housing 1, a stationary dividing wall 25 is fitted, through the middle of which the piston rod 12 extends via a seal 26. Section 3 of the cylinder 2, which is now separated in this way from section 4, is divided by a piston 27, which is secured to the piston rod 12 by means of a retaining ring 28 and is sealed at its outer circumference by means of a seal 29, into two pressure chambers, namely, a release-pressure chamber 30 and an application-pressure chamber 31.

The dividing wall 25 is also provided with a seal 36 on its outer circumference in order to seal off the application-pressure chamber 31 from the exterior. A supporting ring 37 supports the seal 36 against the cap 5.

The release-pressure chamber 30 can be pressurized with pressure medium through a release passage 32 and the application-pressure chamber 31 via a transverse bore 33 through the application passage 20.

Figure 4:
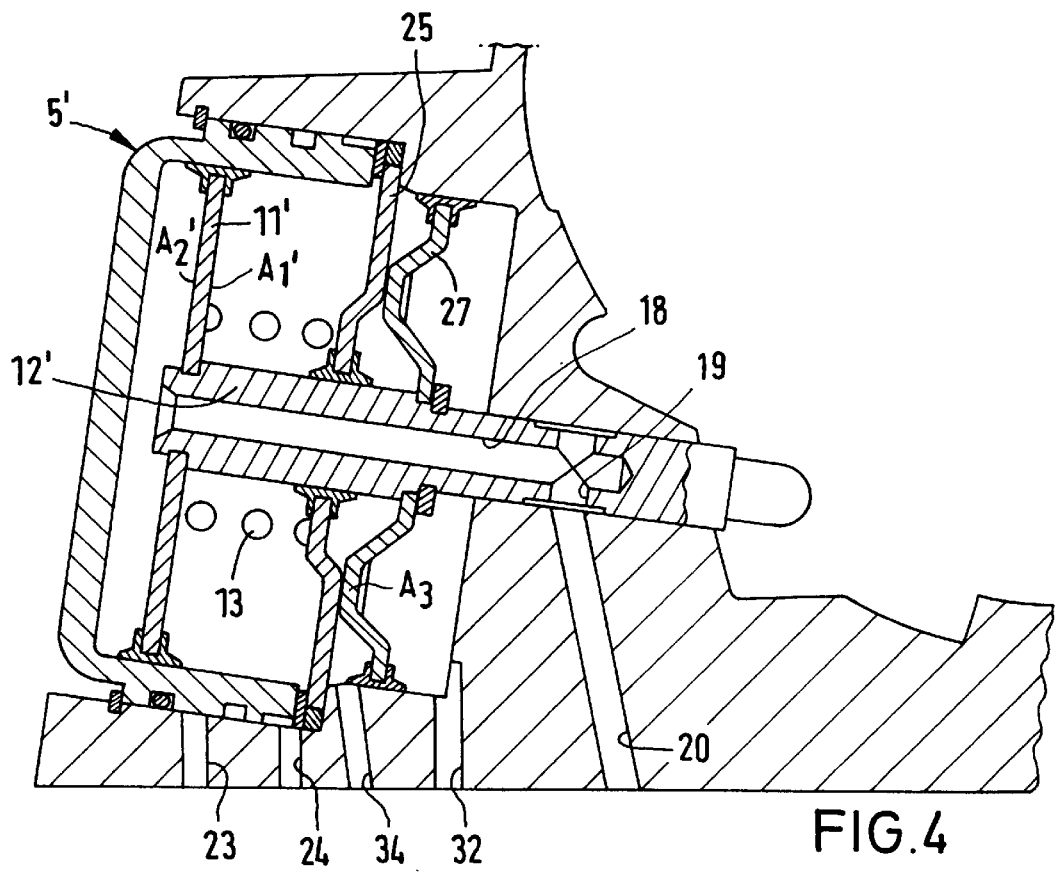
FIG. 4 is a vertical section similar to FIG. 3 through another embodiment of the servo device.
Figure 5:
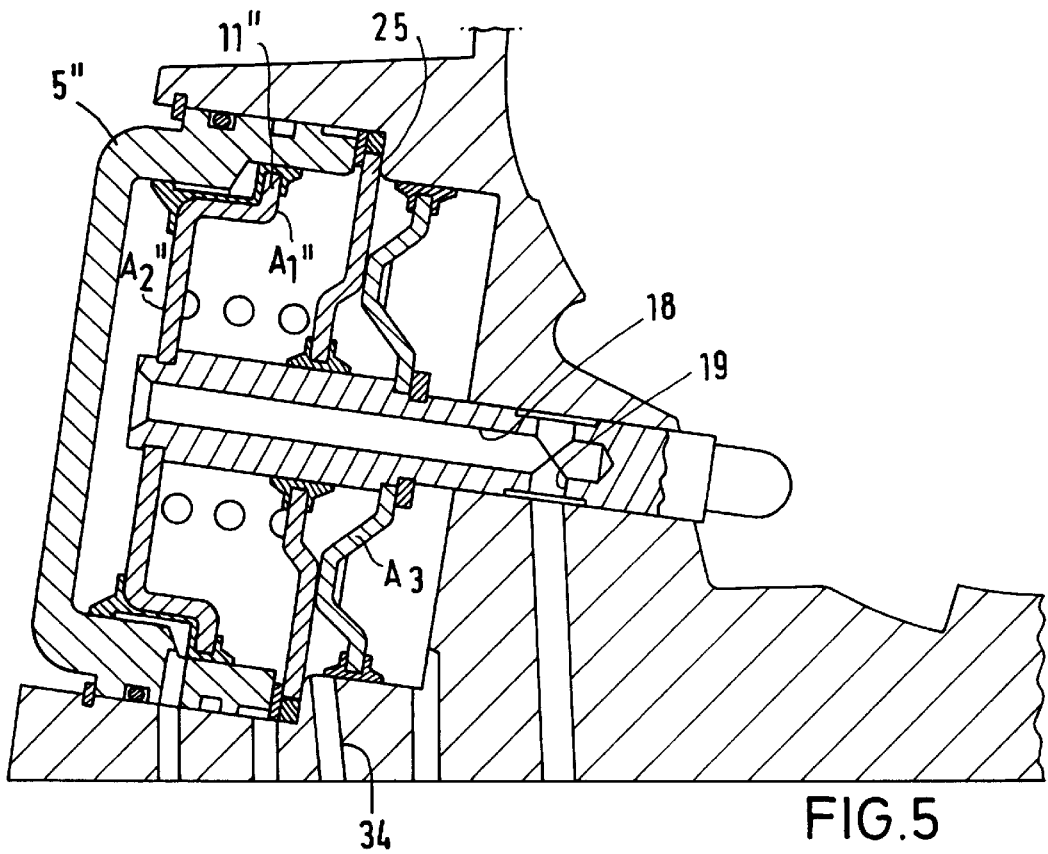
FIG. 5 is a vertical section similar to FIG. 3 through a further embodiment of the servo device.
Figure 6:
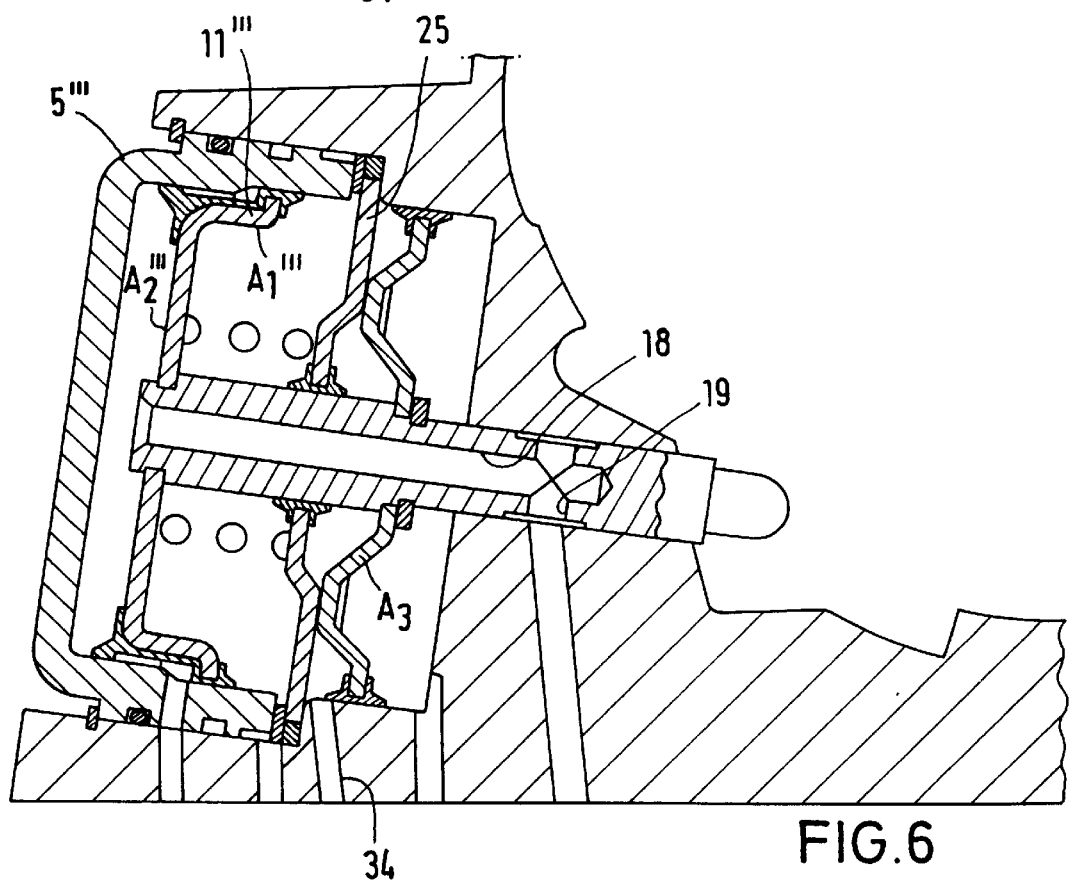
FIG. 6 is a vertical section similar to FIG. 3 through yet another embodiment.

In FIGS. 4 to 6, further embodiments of the invention are shown in which only the essential, corresponding parts are given the same reference symbols and modified parts are identified by symbols with an index.

FIGS. 4 to 6 differ primarily through different caps 5', 5" and 5''', by means of which the tuning of the capacity of the friction brake $B_2$ for the second gear is brought about through variation of the piston face $A_2$, and the variation of the total piston area $(A_1+A_3)$ necessary for the adaptation of the capacity of the clutch $CL_2$ to the capacity of the friction brake $B_2$ is brought about by means of $A_1$.

Figure 7:
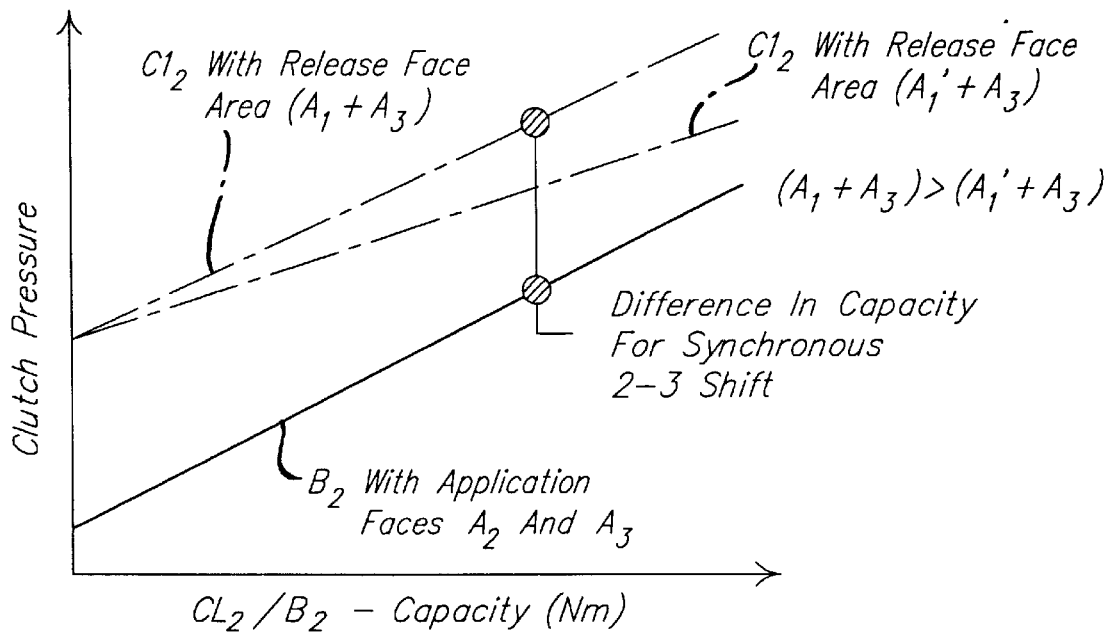
FIG. 7 is a capacity diagram in which the capacity of the friction brake $B_2$ is constant and the capacity of the clutch $CL_2$ is variable by means of the adaptable total piston face area $(A_1+A_3)$ and by variation of the piston face $A_1$.

The tuning of the total piston area $(A_1+A_3)$ on the release sides of the pistons in conjunction with the release side area $A_1$ is represented for a synchronous 2-3 shift in FIG. 7.

By variation of the piston face area $A_1$ on the release side of the servo device corresponding to different engine-transmission variants, with constant dimensions of the transmission housing bores, the difference between the capacity of the friction brake $B_2$ and that of the clutch $CL_2$ can be adjusted to a specific, desired value.

What applies here is that the larger the total piston face area $(A_1+A_3)$ relative to the piston face area $A_2$, the greater is the difference in capacity between $B_2$ and $CL_2$.

This difference in capacity is necessary in order to enable the capacity of the friction brake $B_2$ to be maintained in a 2-3 shift during the synchronization process.

The servo device for a friction brake $B_2$ according to the invention has the advantage that it can be used for internal combustion engines with normal power output characteristics by omitting the stationary dividing wall 25 and the additional piston 27. If, however, the automatic transmission should come to be used for internal combustion engines with high power output, then without changes in the transmission housing becoming necessary, the stationary dividing wall 25, the supporting ring 37, and the piston 27 can be fitted and the transverse bore 33 can be opened for pressurization of the application-pressure chamber 31.

In this way, the desired higher torque capacity for the friction brake $B_2$ can be made available without any increase in the diameter of the servo device.

By the use of the various caps 5', 5" and 5''' having cylinders 6 with differently stepped sections 7 and 8, the necessary adaptation of the different piston faces $A_1$ and $A_2$, which is important for the tuning of the shift from second gear to third gear, can be undertaken without machining of the cylinder bore 2 in the transmission housing being necessary.

Since, in the cases of the embodiments of FIGS. 4–6, an increase in the torque capacity of the brake band of the friction brake $B_2$ is not needed, but the additional volume of the release-pressure chamber 30 of the piston 27 is required for the synchronous 2-3 shift, the transverse bore 33 provided in FIG. 3 is omitted and the application-pressure chamber 31 is connected by a passage 34 to the outlet (Ex).

We claim:

1. In an automatic transmission for motor vehicles having two planetary gear sets, and friction clutches and brakes operable to control elements of the gearsets, an hydraulic servo for a friction brake comprising:

a cylinder having a stationary dividing wall dividing the cylinder into first and second mutually sealed sections;

a piston rod extending through the dividing wall via a seal;

a first piston located in the first section of said cylinder, secured to the piston rod, dividing the first section into an application-pressure chamber and a release-pressure chamber;

a cap located in said first section, releasably fixed to the cylinder, having a surface at which the first piston is sealed;

a second piston located in the second section of the cylinder, secured to the piston rod dividing the second section into an application-pressure chamber and a release-pressure chamber;

the application-pressure chambers arranged in tandem and connected through hydraulic passages formed in the common piston rod;

an application passage connected to the hydraulic passages; and first and second release passages communicating with the release-pressure chambers, respectively.

2. In an automatic transmission for motor vehicles having two planetary gear sets, and friction clutches and brakes operable to control elements of the gearsets, an hydraulic servo for a friction brake, comprising:

a stepped cylinder having a stationary dividing wall dividing the cylinder into first and second mutually sealed sections;

a piston rod extending through the dividing wall via a seal;

a stepped piston located in the first section of the stepped cylinder, secured to the piston rod, dividing the first second section into an application-pressure chamber having a smaller face and a release-pressure chamber having a larger face;

a cap located in said first section, releasable fixed to the cylinder, having a stepped inner surface defining a first small diameter surface at which said smaller face is sealed and a second larger diameter surface at which said larger face is sealed;

a second piston located in the second section of the cylinder, secured to the piston rod dividing the second section into an application-pressure chamber and a release-pressure chamber;

hydraulic passages formed in the common piston rod and connecting the application-pressure chambers;

an application passage connected to the hydraulic passages; and first and second release passages communicating with the release-pressure chambers respectively.

* * * * *